(12) United States Patent
Aoto et al.

(10) Patent No.: US 12,344,119 B2
(45) Date of Patent: Jul. 1, 2025

(54) BATTERY MANAGEMENT SYSTEM AND BATTERY MANAGEMENT METHOD

(71) Applicant: PANASONIC INTELLECTUAL PROPERTY MANAGEMENT CO., LTD., Osaka (JP)

(72) Inventors: Koji Aoto, Hyogo (JP); Toshiya Zaitsu, Tokyo (JP); Hiromitsu Ebisu, Tokyo (JP); Hiroki Shinohara, Kanagawa (JP); Masashi Takemura, Kanagawa (JP); Kenichiro Shibasaki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 758 days.

(21) Appl. No.: 17/600,530

(22) PCT Filed: Mar. 20, 2020

(86) PCT No.: PCT/JP2020/012551
§ 371 (c)(1),
(2) Date: Sep. 30, 2021

(87) PCT Pub. No.: WO2020/203377
PCT Pub. Date: Oct. 8, 2020

(65) Prior Publication Data
US 2022/0219564 A1 Jul. 14, 2022

(30) Foreign Application Priority Data

Apr. 1, 2019 (JP) .................................. 2019-070128

(51) Int. Cl.
*B60L 53/80* (2019.01)
*B60L 53/65* (2019.01)
(Continued)

(52) U.S. Cl.
CPC ............... *B60L 53/80* (2019.02); *B60L 53/65* (2019.02); *B60L 53/67* (2019.02); *B60L 53/68* (2019.02);
(Continued)

(58) Field of Classification Search
CPC ....................................... B60L 53/80
See application file for complete search history.

(56) References Cited

U.S. PATENT DOCUMENTS

2010/0094496 A1* 4/2010 Hershkovitz ........... B60L 50/66
701/22
2010/0262312 A1* 10/2010 Kubota ..................... H02J 7/35
713/340
(Continued)

FOREIGN PATENT DOCUMENTS

JP 2014-525231 9/2014
JP 2017-502453 1/2017
(Continued)

OTHER PUBLICATIONS

Official Communication issued in International Patent Application No. PCT/JP2020/012551, dated Jun. 30, 2020, along with an English translation thereof.

*Primary Examiner* — Tynese V McDaniel
(74) *Attorney, Agent, or Firm* — Greenblum & Bernstein, P.L.C.

(57) ABSTRACT

To identify a battery device that may have an abnormality in the future and promptly recall such a battery device, a battery management system includes a management server connected to a plurality of battery exchangers via a network and configured to manage exchanging states of battery packs at the battery exchangers, and a user terminal carried by each user and connected to the management server via the network, wherein the management server is configured to identify a user using a battery pack to be recalled, and to (Continued)

transmit an exchange reminder to the user terminal of the identified user, and the user terminal is configured to perform a notification operation that prompts the identified user to exchange the battery pack upon receiving the exchange reminder.

2 Claims, 9 Drawing Sheets

(51) Int. Cl.
  *B60L 53/67* (2019.01)
  *B60L 53/68* (2019.01)
(52) U.S. Cl.
  CPC ....... *B60L 2200/12* (2013.01); *B60L 2240/72* (2013.01); *B60L 2250/16* (2013.01)

(56) References Cited

U.S. PATENT DOCUMENTS

| | | | |
|---|---|---|---|
| 2011/0113367 A1* | 5/2011 | Carter | G06Q 10/00 715/808 |
| 2011/0218703 A1* | 9/2011 | Uchida | B60L 58/12 701/31.4 |
| 2012/0303397 A1* | 11/2012 | Prosser | B60L 53/18 705/7.12 |
| 2013/0030696 A1 | 1/2013 | Wu et al. | |
| 2013/0264996 A1* | 10/2013 | Soong | B60L 53/305 320/109 |
| 2015/0039391 A1* | 2/2015 | Hershkovitz | G06Q 10/04 705/7.31 |
| 2015/0123468 A1 | 5/2015 | Wu et al. | |
| 2015/0367743 A1* | 12/2015 | Lin | B60L 53/305 320/109 |
| 2018/0253787 A1 | 9/2018 | Takatsuka et al. | |
| 2018/0272881 A1* | 9/2018 | Kojima | B60L 53/66 |
| 2019/0207397 A1* | 7/2019 | Lai | B60L 53/68 |
| 2019/0377029 A1* | 12/2019 | Shiiyama | G01R 31/367 |
| 2020/0051092 A1* | 2/2020 | D'Souza | G06Q 30/014 |
| 2020/0384879 A1* | 12/2020 | Ebisu | B60L 53/305 |
| 2020/0391602 A1* | 12/2020 | Ikui | H01M 10/48 |
| 2020/0402075 A1* | 12/2020 | Ebisu | G06Q 30/0645 |
| 2021/0296670 A1* | 9/2021 | Mori | B60L 53/665 |
| 2021/0316633 A1* | 10/2021 | Kalligeros | B60L 53/80 |
| 2021/0382971 A1* | 12/2021 | Ebisu | B60L 53/80 |
| 2022/0080943 A1* | 3/2022 | Liu | B60L 58/16 |
| 2022/0185143 A1* | 6/2022 | Takemura | H02J 13/00 |
| 2022/0187093 A1* | 6/2022 | Takemura | H01M 10/482 |
| 2022/0219564 A1* | 7/2022 | Aoto | B60L 3/0046 |
| 2022/0320881 A1* | 10/2022 | Zaitsu | H01M 10/46 |
| 2022/0329091 A1* | 10/2022 | Takemura | B60L 53/80 |
| 2022/0383402 A1* | 12/2022 | Takemura | B60L 53/66 |
| 2023/0080952 A1* | 3/2023 | Okawa | B60L 53/80 320/107 |
| 2023/0226939 A1* | 7/2023 | Ehara | B60L 53/66 320/109 |
| 2023/0278451 A1* | 9/2023 | Ehara | B60L 53/62 320/109 |
| 2023/0286398 A1* | 9/2023 | Agatsuma | G06Q 30/0645 |
| 2023/0391222 A1* | 12/2023 | Yamamoto | H02J 7/0013 |
| 2024/0039311 A1* | 2/2024 | Padmalayam | B60L 53/80 |
| 2024/0094790 A1* | 3/2024 | Kurimoto | B60L 53/65 |

FOREIGN PATENT DOCUMENTS

| | | |
|---|---|---|
| JP | 2017-091426 | 5/2017 |
| JP | 2018-160074 | 10/2018 |
| WO | 2010/117082 | 10/2010 |

\* cited by examiner

| serial number of battery pack | battery station | | battery exchanger | | user | | | ... |
|---|---|---|---|---|---|---|---|---|
| | number | name | number | slot | user ID | name | vehicle type | ... |
| XXXXXXXX | XX | XXXXXX | XX | XX | XXXXX | XXXX | XXXX | ... |
| ⋮ | ⋮ | ⋮ | ⋮ | ⋮ | ⋮ | ⋮ | ⋮ | ⋮ | recalled battery list

*Fig.7A*

| recalled battery list for each maintenance base | | | | | |
|---|---|---|---|---|---|
| maintenance base XXX | | | | | |

| battery station | | battery exchanger | | serial number of battery pack | ... |
|---|---|---|---|---|---|
| number | name | number | slot | | ... |
| xx | xxxxxx | xx | xx | xxxxxxxx | ... |
| ⋮ | ⋮ | ⋮ | ⋮ | ⋮ | ⋮ |

BATTERY MANAGEMENT SYSTEM AND BATTERY MANAGEMENT METHOD

TECHNICAL FIELD

The present disclosure relates to a battery exchange service that enables users of electric vehicles or the like to exchange battery devices at battery stations, and more particularly, to a battery management system and a battery management method for managing shared battery devices.

BACKGROUND ART

In recent years, electric vehicles such as electric motorcycles have attracted attention from the viewpoint of solving the problems of air pollution due to exhaust gas and high fuel costs. The cruising ranges of such electric vehicles are progressively extended owing to the improvement in the performance of battery devices, but such electric vehicles may cause inconvenience since they cannot travel continuously for a long time due to the necessity for charging the battery devices.

In order to eliminate such inconvenience, there is a conventional battery exchange service that enables the electric vehicles to travel continuously for a long time by fitting the electric vehicles with detachable battery devices so that exhausted battery devices can be exchanged with fully charged battery devices at battery stations (see Patent Documents 1 and 2).

Also, in a similar battery exchange service, there is a conventional technique that activates a locking mechanism so as to prevent a battery device from being exchanged when a sensor provided in the battery device or a battery exchange device detects a dangerous state (an abnormality of a temperature level, a voltage level, or a current level, a short circuit, or the like) (see Patent Document 3).

PRIOR ART DOCUMENT(S)

Patent Document(s)

Patent Document 1: JP2014-525231A
  Patent Document 2: JP2017-91426A
  Patent Document 3: JP2017-502453A

SUMMARY OF THE INVENTION

Task to be Accomplished by the Invention

By the way, after sharing of the battery devices is started, an abnormality of a battery device may be found. If such an abnormality is caused by some fault in a manufacturing stage, another battery device manufactured on the same manufacturing line at the same time may also have a similar abnormality. Accordingly, it is desirable to identify the battery device which may have an abnormality in the future, to stop using the battery device, and to promptly recall the battery device.

However, in the conventional technique disclosed in Patent Document 3, the sensor detects an abnormality that has already occurred in the individual battery device, and it is impossible to identify a battery device that may have an abnormality in the future and to promptly recall such a battery device.

In view of such a problem of the prior art, a primary object of the present invention is to provide a battery management system and a battery management method that can identify a battery device that may have an abnormality in the future and promptly recall such a battery device.

Means to Accomplish the Task

The present invention provides a battery management system including a plurality of battery exchange devices located in respective battery stations and configured to store and charge battery devices returned by users and to rent the charged battery devices to the users in exchange for the returned battery devices; a server device connected to the battery exchange devices via a network and configured to manage exchanging states of the battery devices at the battery exchange devices; and a terminal device carried by each user and connected to the server device via the network; wherein the server device is configured to identify a user using a battery device to be recalled, and to transmit an exchange reminder to the terminal device of the identified user, and the terminal device is configured to perform a notification operation that prompts the identified user to exchange the battery device upon receiving the exchange reminder.

The present disclosure further provides a battery management method for a server device to manage shared battery devices in a battery exchange service, the battery management method including: registering individual identification information on battery devices when sharing of the battery devices is started and managing the shared battery devices based on the individual identification information, identifying a user using a battery device to be recalled and transmitting an exchange reminder to a terminal device of the identified user in a case where the individual identification information on the battery device to be recalled is registered, and performing a notification operation that prompts the identified user to exchange the battery device by using the terminal device that has received the exchange reminder.

Effect of the Invention

According to the present disclosure, it is possible to identify a user using a battery device to be recalled, to prompt the user to return the battery device to be recalled, and to promptly recall the battery device to be recalled.

DESCRIPTION OF THE PREFERRED EMBODIMENT(S)

To achieve such an object, the first aspect of the present invention provides a battery management system including a plurality of battery exchange devices located in respective battery stations and configured to store and charge battery devices returned by users and to rent the charged battery devices to the users in exchange for the returned battery devices; a server device connected to the battery exchange devices via a network and configured to manage exchanging states of the battery devices at the battery exchange devices; and a terminal device carried by each user and connected to the server device via the network; wherein the server device is configured to identify a user using a battery device to be recalled, and to transmit an exchange reminder to the terminal device of the identified user, and the terminal device is configured to perform a notification operation that prompts the identified user to exchange the battery device upon receiving the exchange reminder.

According to this aspect, it is possible to identify the user using the battery device to be recalled, to prompt the identified user to return the battery device to be recalled, and to promptly recall the battery device to be recalled.

According to the second aspect of the present invention, the server device is configured to identify the user using the battery device to be recalled based on management information that associates the battery devices with the users to whom the battery devices are rented, and to transmit the exchange reminder to the terminal device of the identified user.

According to this aspect, it is possible to efficiently identify the user and transmit the exchange reminder by using the management information generated by the server device.

According to the third aspect of the present invention, the server device is configured to acquire individual identification information on each battery device from a vehicle via the terminal device, to compare the acquired individual identification information with the individual identification information on the battery device to be recalled, and to transmit the exchange reminder to the terminal device of the identified user in a case where the acquired individual identification information matches the individual identification information on the battery device to be recalled.

According to this aspect, under any circumstances, it is possible to efficiently perform the notification operation, which prompts exchange of the battery device, for the user using the battery device to be recalled.

According to the fourth aspect of the present invention, the server device is configured to output display information for displaying the battery device to be recalled on a list.

According to this aspect, it is possible to efficiently perform the work of recalling the battery device to be recalled.

The fifth aspect of the present invention provides a battery management method for a server device to manage shared battery devices in a battery exchange service, the battery management method including: registering individual identification information on battery devices when sharing of the battery devices is started and managing the shared battery devices based on the individual identification information, identifying a user using a battery device to be recalled and transmitting an exchange reminder to a terminal device of the identified user in a case where the individual identification information on the battery device to be recalled is registered, and performing a notification operation that prompts the identified user to exchange the battery device by using the terminal device that has received the exchange reminder.

According to this aspect, like the first aspect of the present invention, it is possible to identify the user using the battery device to be recalled, to prompt the identified user to return the battery device to be recalled, and to promptly recall the battery device to be recalled.

In the following, an embodiment of the present disclosure will be described with reference to the appended drawings.

Figure 1:
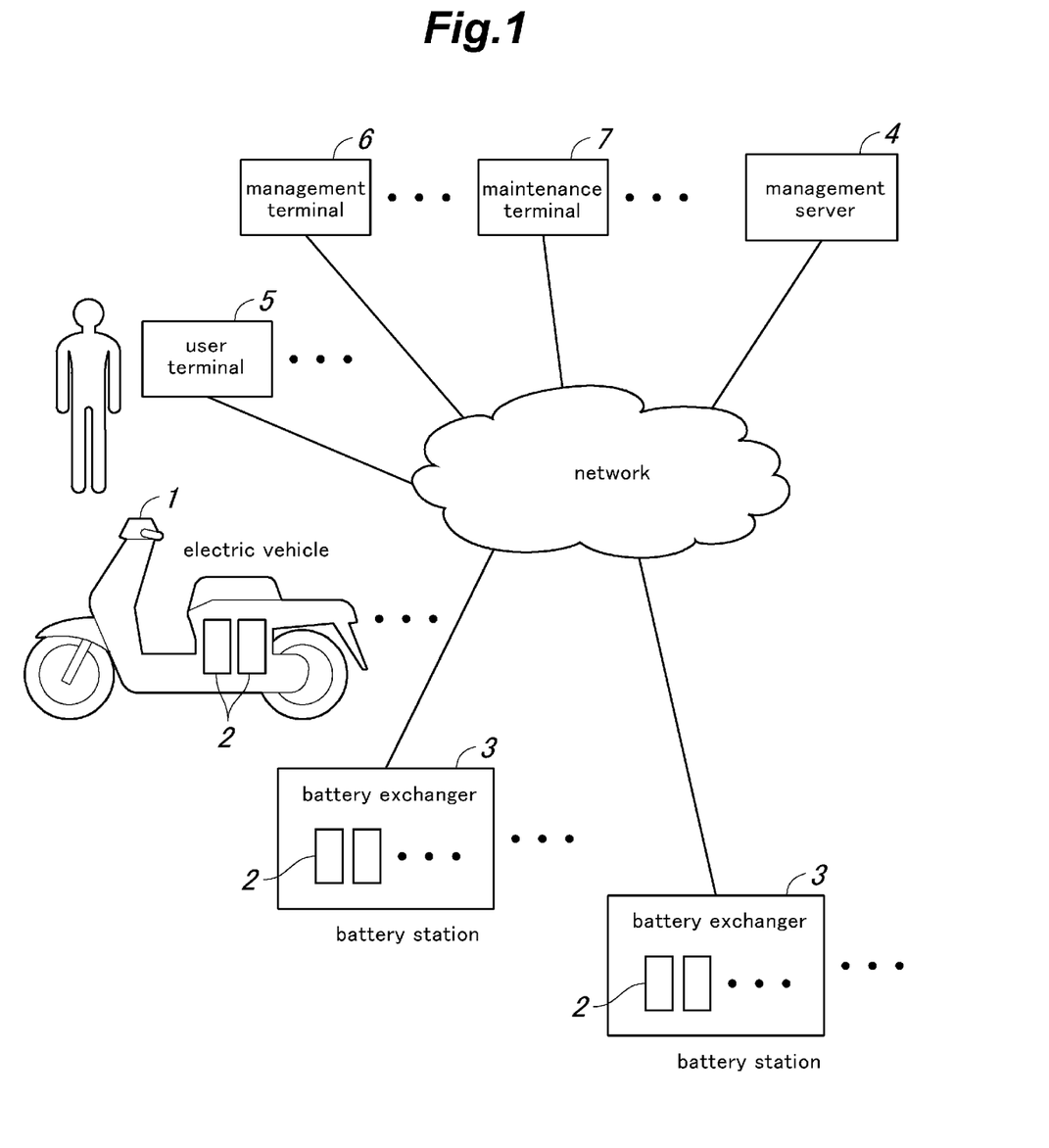
FIG. 1 is an overall schematic diagram of a battery sharing system according to an embodiment.

FIG. 1 is an overall schematic diagram of a battery sharing system according to an embodiment of the present invention.

This battery sharing system is configured to provide a service in which battery packs 2 (battery devices) fitted to electric vehicles 1 such as electric motorcycles can be shared among a plurality of users, and includes battery exchangers 3 (battery exchange devices), a management server 4 (server device), user terminals 5 (terminal devices), management terminals 6, and maintenance terminals 7.

The battery exchangers 3, the management server 4, the user terminals 5, the management terminals 6, and the maintenance terminals 7 are connected via a network such as the Internet. The battery exchangers 3 and the user terminals 5 are connected to the network via a wireless communication such as a mobile communication network and a wireless LAN.

Each electric vehicle 1 is fitted with the battery packs 2, and travels on the electric power of the battery packs 2. The electric vehicle 1 consists of an electric motorcycle in the example shown in FIG. 1, but may also consist of a four-wheeled vehicle. Further, the electric vehicle 1 may be a mobility device not designed for public roads such as an electric wheelchair, an electric cart, or a riding cart for use in a theme park, a golf course, or the like.

Each battery exchanger 3 stores and charges the battery packs 2 returned by the users, and rent the charged battery packs 2 to the users in exchange for the returned battery packs 2. The battery exchangers 3 are installed in battery stations attached to facilities (stores) such as convenience stores and gas stations. A plurality of battery exchangers 3 are installed in each one of the battery stations.

The management server 4 manages the exchanging states of the battery packs 2 in each battery exchanger 3. Also, the management server 4 monitors the state of the battery exchanger 3 (whether the battery exchanger 3 is in an online state) and the states of the battery packs 2 stored in the battery exchanger 3 (whether the battery packs 2 are fully charged), and transmits the state information on the battery exchanger 3 and the battery packs 2 to the management terminals 6 and the maintenance terminals 7. Further, the management server 4 transmits information on each battery station and the like to the user terminals 5.

Each user terminal 5 consists of a smartphone, a tablet terminal, or the like, and is carried by the user of the electric vehicle 1. The user terminal 5 displays screens transmitted from the management server 4, for example, a screen for guiding locations of the battery stations or a screen for making a battery exchange reservation.

Each management terminal 6 is installed in a facility to receive the users such as a management center, and is operated by an administrator. On the management terminal 6, the administrator performs an operation for user registration. Also, on the management terminal 6, the administrator checks the information transmitted from the management server 4.

Each maintenance terminal 7 is installed in a facility dedicated for a maintenance operation or a facility such as a store provided with the battery station, and is operated by a maintenance person. On the maintenance terminal 7, the maintenance person checks the information transmitted from the management server 4.

The battery packs 2 to be fitted to electric vehicles 1 are given as an example in the present embodiment, but battery devices to which the battery packs 2 are fitted are not limited to the electric vehicles 1, and may be portable power supply devices, for example.

Figure 2:
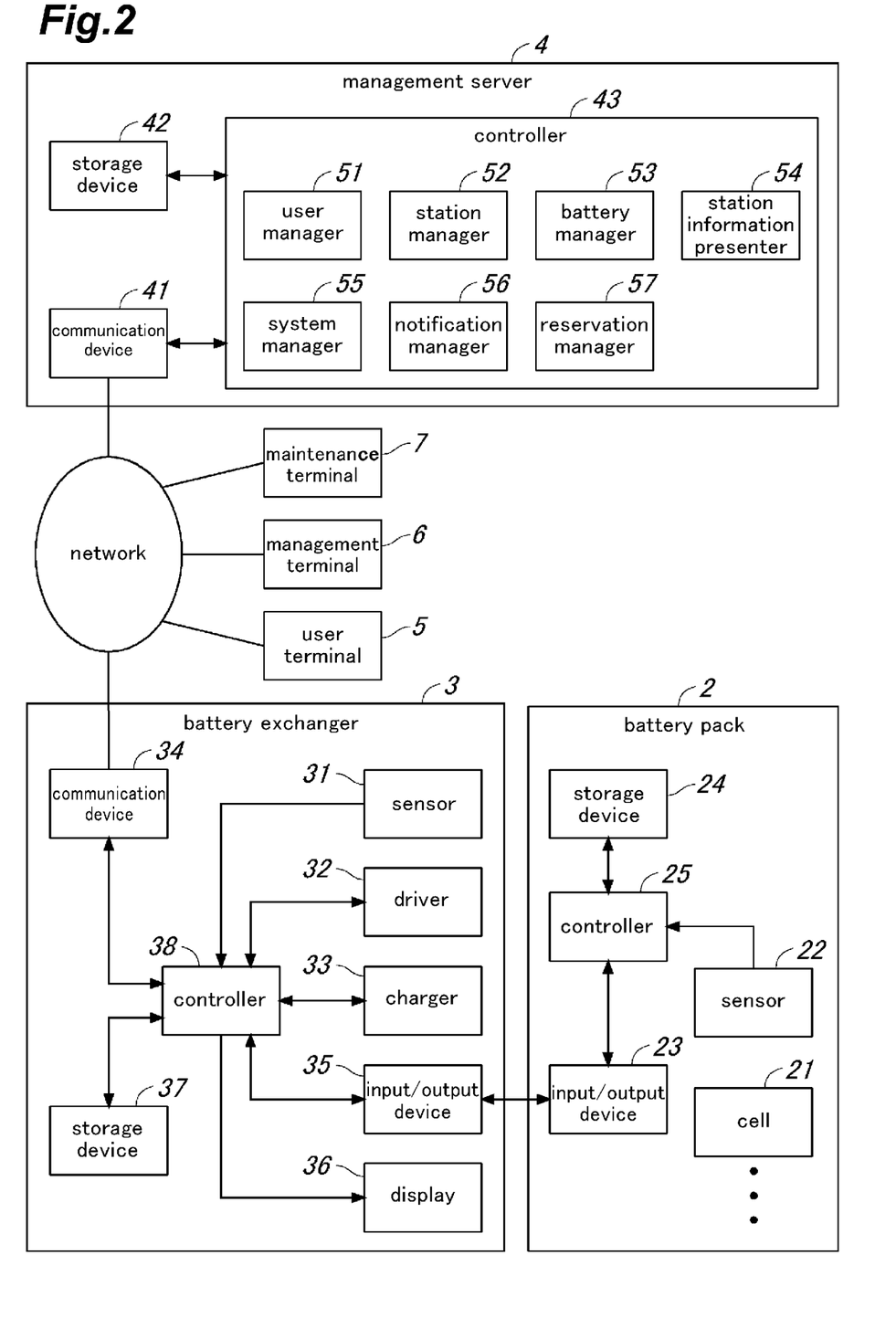
FIG. 2 is a block diagram showing schematic configurations of a battery pack 2, a battery exchanger 3, and a management server 4.

Next, schematic configurations of each battery pack 2, each battery exchanger 3, and the management server 4 will be described. FIG. 2 is a block diagram showing the schematic configurations of the battery pack 2, the battery exchanger 3, and the management server 4.

Each battery pack 2 includes cells 21, a sensor 22, an input/output device 23, a storage device 24, and a controller 25.

The sensor 22 detects a voltage, current, temperature, or the like of each cell 21.

The input/output device 23 transmits and receives information to and from each battery exchanger 3. For example, the input/output device 23 outputs a serial number, an alert, degradation information, or the like to the battery exchanger 3.

The storage device 24 stores programs to be executed by the processor that constitutes the controller 25. Further, the storage device 24 stores a serial number (individual identification information) and the like. This serial number is associated with information on manufacture (for example, information on a manufacturing lot) of the battery pack 2. For example, the serial number may include a manufacturing date, an initial of a factory name, and the like. Incidentally, from this serial number, a group of battery packs 2 in the same manufacture can be identified directly or indirectly.

The controller 25 consists of a processor, and controls various parts of the battery pack 2. For example, the controller 25 detects an abnormality or a degraded state of each cell 21 based on a detection result of the sensor 22, and causes the input/output device 23 to output an alert or degradation information.

Each battery exchanger 3 includes a sensor 31, a driver 32, a charger 33, a communication device 34, an input/output device 35, a display 36, a storage device 37, and a controller 38.

The sensor 31 consists of a human sensor, for example, and detects a person who visits the battery exchanger 3 for battery exchange.

Incidentally, the battery exchanger 3 may perform user authentication to identify the user who visits the battery exchanger 3 for the battery exchange. In this case, the battery exchanger 3 may identify the user by face recognition based on an image captured by a camera. Also, the battery exchanger 3 may identify the user by communicating with an RFID (radio frequency identifier) tag or a non-contact type IC card carried by the user, or by communicating with each user terminal 5 equipped with an NFC (Near Field Communication) function. Further, the battery exchanger 3 may detect that the user is about to return each battery pack 2 by reading a two-dimensional code affixed to the battery pack 2 based on the image captured by the camera.

In response to an instruction from the controller 38, the driver 32 drives, upon return or rental of the battery packs 2, an opening/closing mechanism of an opening/closing door and a storing/dispensing mechanism for storing the returned battery packs 2 and dispensing the battery packs 2 to be rented to the users. In particular, when the sensor 31 detects the user, the driver 32 starts a battery exchange operation and thus opens the opening/closing door, thereby making the user return the battery packs 2.

The charger 33 charges the battery packs 2 held in slots (trays).

The communication device 34 communicates with the management server 4 via the network.

The input/output device 35 transmits and receives information to and from the battery packs 2. For example, the serial numbers, alerts, deterioration information on the battery packs 2 are received from the battery packs 2.

The display 36 displays a guidance screen for guiding the user through exchange of the battery packs 2.

The storage device 37 stores programs to be executed by a processor that constitutes the controller 38. Also, the storage device 37 stores a shared battery list relating to the battery packs 2 to be used in the battery exchange service, a rental order list defining the battery packs 2 to be rented at each battery exchanger 3 and a rental order of the battery packs 2. The shared battery list and the rental order list are received from the management server 4.

The controller 38 consists of a processor, and controls various parts of each battery exchanger 3. For example, the controller 38 determines whether the returned battery packs 2 are genuine products (battery packs 2 to be used in the battery exchange service) based on the shared battery list. Further, the controller 38 selects the battery packs 2 to be rented based on the rental order list, and causes the driver 32 to perform an operation of renting the battery packs 2. Further, the controller 38 causes the communication device 34 to transmit a return/rental list (including serial numbers or the like), which relates to the returned battery packs 2 and the rented battery pack 2, to the management server 4.

The management server 4 includes a communication device 41, a storage device 42, and a controller 43.

The communication device 41 communicates with each battery exchanger 3, each user terminal 5, each management terminal 6, and each maintenance terminal 7 via the network.

The storage device 42 stores programs to be executed by the processor that constitutes the controller 43. Also, the storage device 42 stores management information such as user registration information, the shared battery list relating to the battery packs 2 to be used in the battery exchange service, an excluded battery list relating to the battery packs 2 to be excluded from the battery exchange service, and associating information that associates the battery packs 2 with the users to whom the battery packs 2 are rented.

The controller 43 includes a user manager 51, a station manager 52, a battery manager 53, a station information presenter 54, a system manager 55, a notification manager 56, and a reservation manager 57. The controller 43 consists of a processor, and the processor executes the programs stored in the storage device 42 to realize various components of the controller 43.

The user manager 51 manages the users who use the battery packs 2. For example, the administrator accepts applications for new registration from the users, and registers user information (user IDs, names, addresses, and vehicle types of electric vehicles 1 to be used) by operating each management terminal 6 (user registration).

The station manager 52 manages each battery station and each battery exchanger 3 installed therein. For example, when the battery packs 2 are exchanged at the battery exchanger 3, the station manager 52 updates the rental order list, which defines the battery packs 2 to be rented at the battery exchanger 3 and the rental order of the battery packs 2, and causes the communication device 41 to transmit the rental order list to the battery exchanger 3.

The battery manager 53 manages the shared battery packs 2. For example, the battery manager 53 registers the serial number of each battery pack 2 on the shared battery list (new registration) when sharing of the battery pack 2 is started. Further, the battery manager 53 manages the associating information that associates the battery packs 2 with the users to whom the battery packs 2 are rented. More specifically, the battery manager 53 generates the associating information that associates the battery packs 2, which have been rented first after a user registration, with the user. When the battery packs 2 are exchanged at the battery exchanger 3, the battery manager 53 updates the associating information by using the return/rental list received from the battery exchanger 3 relating to the exchange of the battery packs 2. Further, when the administrator performs a utilization stop operation on the management terminal 6, the battery manager 53 registers the serial number, which is inputted into the management terminal 6, in the excluded battery list. In particular, the serial number of each battery pack 2 is directly or indirectly associated with the information on the manufacture of the battery pack 2. Accordingly, it is possible to identify a battery pack 2 that may have an abnormality in the future, to stop utilization of such a battery pack 2, and to promptly recall such a battery pack 2 by registering on the excluded battery list the battery packs 2 that have been manufactured at the same time on the same manufacturing line as the battery pack 2 for which the abnormality has been found.

The station information presenter 54 presents the information on the battery stations to the users. For example, the station information presenter 54 generates a station guidance screen for guiding each user through the battery stations, and transmits this information to each user terminal 5, thereby causing the user terminal 5 to display the station guidance screen. This station guidance screen guides the user through the locations of the battery stations and the number of battery packs 2 that can be exchanged at each battery station.

The system manager 55 monitors the status of the system, and presents the status of the system to the administrator and the maintenance person. For example, the system manager 55 generates a management screen to display the status of the system and transmits the management screen to each management terminal 6 and each maintenance terminal 7, thereby causing the management terminal 6 and the maintenance terminal 7 to display the management screen. Accordingly, the administrator and the maintenance person can check the status of the system. More specifically, the system manager 55 collects information (information collection) on a state of each battery exchanger 3 installed in each battery station, a state of each battery pack 2 stored in the battery exchanger 3, a state of the battery exchange performed at the battery exchanger 3, and the like. The system manager 55 displays such state information on the management screen. Further, according to a degree of urgency, the system manager 55 displays items, which are detected from the state information on the system, on the management screen as errors (abnormalities), alerts (warnings), or normal notifications.

The notification manager 56 manages notifications (information) to each user. More specifically, the notification manager 56 transmits to each user terminal 5 guidance on the opening and closing of each battery station, maintenance information on construction or the like to be performed at the battery station, and guidance that the battery exchange reservation cannot be made at the battery station due to a network failure or the like.

The reservation manager 57 manages the battery exchange reservation by each user. More specifically, the reservation manager 57 accepts the battery exchange reservation when the user performs a reservation operation on the user terminal 5. Also, the reservation manager 57 cancels the battery exchange reservation when the user performs a cancellation operation of the battery exchange reservation on the user terminal 5. Also, if the battery exchange is not performed within a prescribed period after acceptance of the battery exchange reservation, the reservation manager 57 forcibly cancels the battery exchange reservation.

Figure 3:
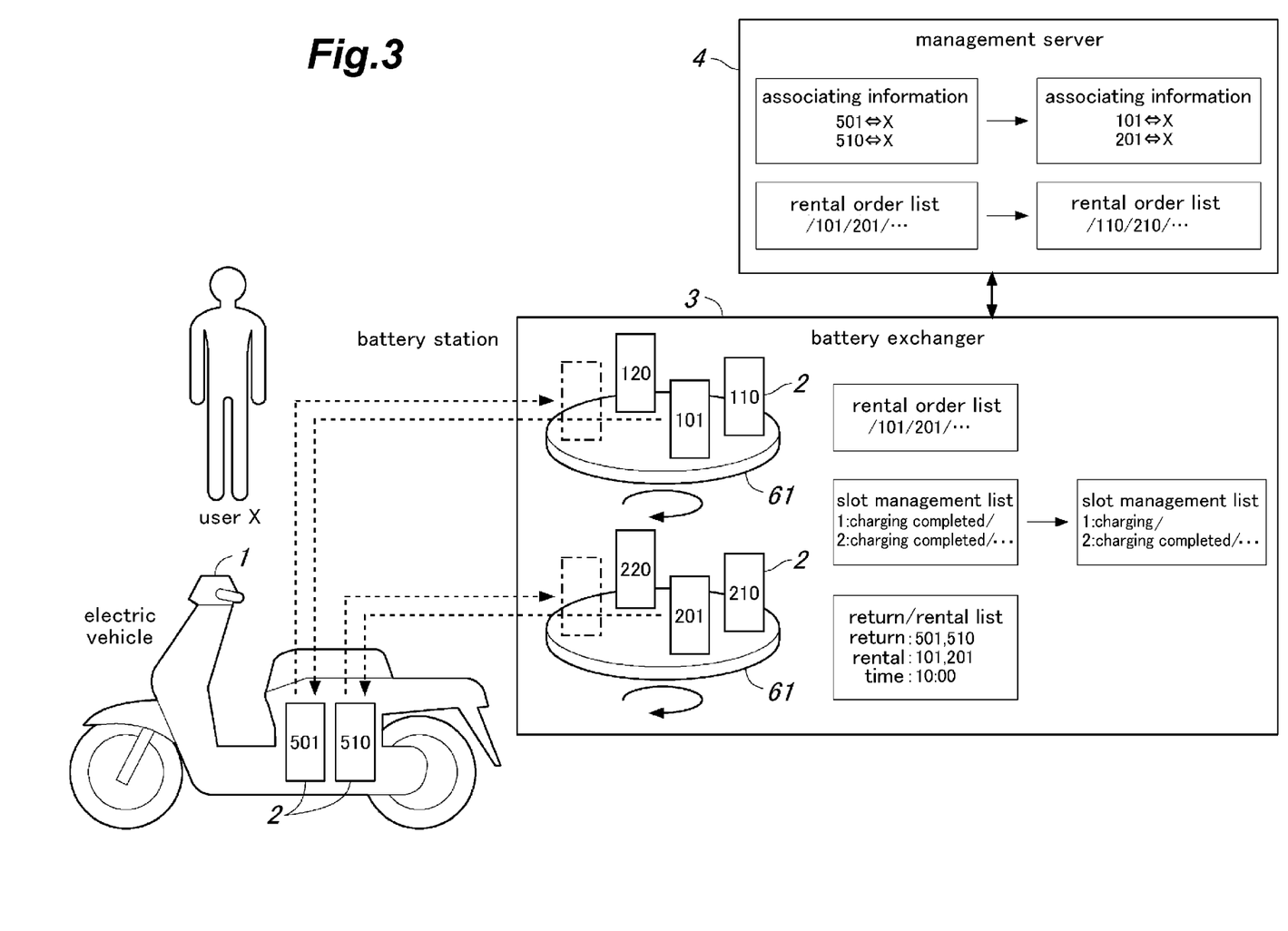
FIG. 3 is an explanatory diagram showing an operation state of the system at a time when the battery packs 2 are exchanged.

Next, an operation state of the system at a time when the battery packs 2 are exchanged will be explained. FIG. 3 is an explanatory diagram showing the operation state of the system at the time when the battery packs 2 are exchanged. Incidentally, in FIG. 3, a three-digit number is assigned to each battery pack 2 for convenience of explanation. In reality, an 8-digit serial number is assigned to each battery pack 2.

The electric vehicle 1 is fitted with one or more battery packs 2. In a case where a plurality of battery packs 2 are fitted to the electric vehicle 1, the plurality of battery packs 2 are exchanged at the same time.

Each battery exchanger 3 stores a plurality of battery packs 2. In the present embodiment, the battery exchanger 3 is provided with a plurality of turntables 61 (storage/dispensing mechanism) having a plurality of slots (trays) for holding the battery packs 2 one by one. In an example shown in FIG. 3, the battery exchanger 3 is provided with two turntables 61 aligned in an upper-and-lower direction and each including four slots. The battery exchanger 3 can store eight battery packs 2 in total.

In this battery exchanger 3, one slot of each turntable 61 is set to an empty state so that one returned battery pack 2 can be stored in each turntable 61. In a case where two battery packs 2 are exchanged at the same time, one battery pack 2 is returned to each of two turntables 61, and one battery pack 2 is rent from each of two turntables 61. Accordingly, for example, in a case where the number of battery packs 2 fitted to the electric vehicle 1 is two, it is possible to exchange two battery packs 2 at the same time by providing the battery exchanger 3 with two turntables 61. Incidentally, a plurality of (for example, four) battery exchangers 3 may be arranged in one battery station. Accordingly, for example, four battery packs 2 can be exchanged at the same time in a case where the number of battery packs 2 fitted to the electric vehicle 1 is four.

In an example shown in FIG. 3, the number of battery packs 2 fitted to the electric vehicle 1 is set to 2. However, there is a case where the number of battery packs 2 fitted thereto is one, or three or more. Further, in an example shown in FIG. 3, the battery exchanger 3 is provided with the turntables 61. However, the battery exchanger 3 may be a locker type exchanger provided with a plurality of chargeable battery holes aligned in the vertical and horizontal directions. Further, the battery exchanger 3 may adopt a configuration that the battery packs are stored in and discharged from a storage part, in which the battery packs are aligned horizontally or vertically, by using a lift mechanism or the like.

After the battery packs 2 are exchanged, the battery exchanger 3 generates the return/rental list (exchange information), and transmits the return/rental list to the management server 4. In this return/rental list, the numbers of the returned battery packs 2, the numbers of the rented battery packs 2, and the time (time stamp) are recorded.

The management server 4 manages the associating information that associates the rented battery packs 2 with the user to whom the battery packs 2 are rented. Upon receiving the return/rental list from the battery exchanger 3, the management server 4 updates the associating information based on the return/rental list (associating process). By performing such an associating process, once the user information is registered in the battery packs 2 that are rented first, the user information is handed over by the management server 4 based on the return/rental list of the battery packs 2. Accordingly, it is not necessary to perform troublesome operations such as user authentication every time the battery packs 2 are exchanged, and the burden on the user can be significantly reduced.

Further, the battery exchanger 3 periodically updates a slot management list and transmits the updated slot management list to the management server 4. In this slot management list, the charging state and the empty state of the battery pack 2 attached to each slot are recorded. Accordingly, the management server 4 can manage the charging state and the empty state of the battery pack 2 at the battery exchanger 3.

Further, the management server 4 generates the rental order list (rental instruction information) defining the battery packs 2 to be rented at the battery exchanger 3 for the battery packs 2 whose charging has been completed at the battery exchanger 3, and transmits the rental order list to the battery exchanger 3.

The battery exchanger 3 selects the battery packs 2 to be rented based on the rental order list received from the management server 4, and then rents the battery packs 2. This rental order list defines the order in which the battery packs 2 are preferentially rented, and the battery exchanger 3 rents the battery packs 2 with the highest priority.

Further, based on the return/rental list received from the battery exchanger 3, the management server 4 updates the rental order list and then transmits the updated rental order list to the battery exchanger 3 every time the battery packs 2 are exchanged.

By the way, in the present embodiment, the battery packs 2 are rented based on the rental order list, and the rental order of the battery packs 2 may be set simply to an order in which charging of the battery packs 2 is completed, or may be set according to a policy relating to utilization of the battery packs 2. For example, degraded states of the battery packs 2 may be transmitted to the management server 4, and the rental order may be set to an order of deterioration levels of the battery packs 2. Accordingly, by promoting utilization of degraded battery packs 2, it is possible to recall the degraded battery packs 2 at an early stage and to exchange the degraded battery packs 2 with new battery packs 2.

Figure 4:
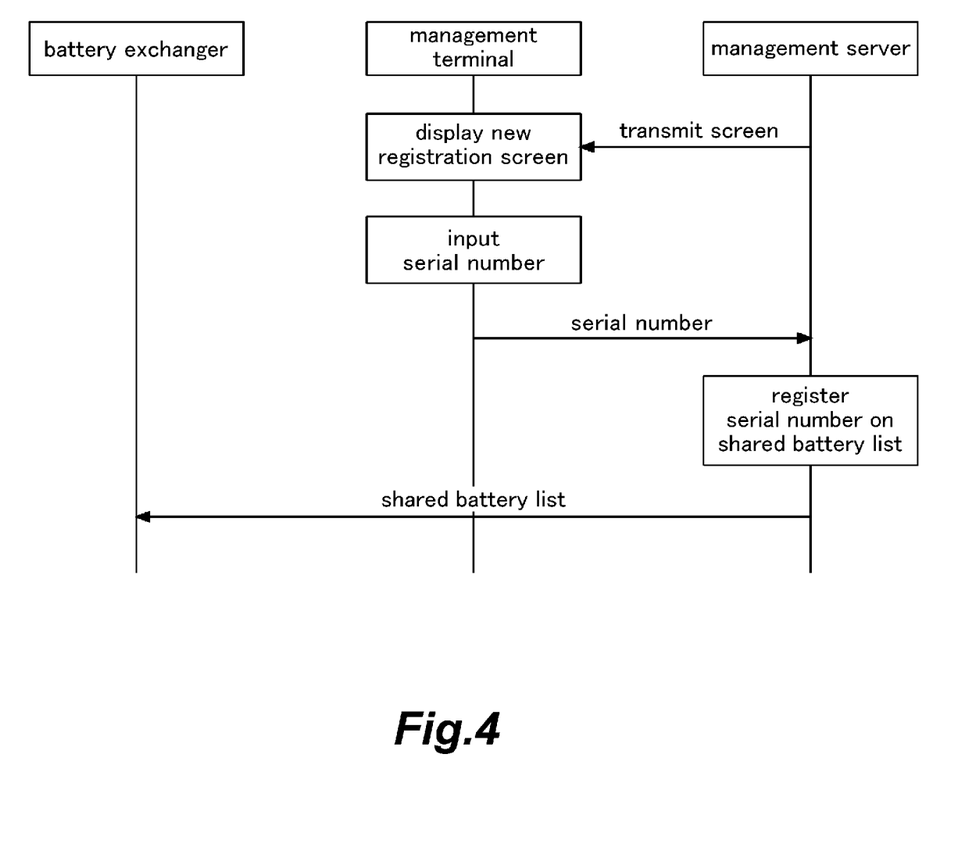
FIG. 4 is a sequence diagram showing an operation procedure of the system at a time when the battery pack 2 is newly registered.

Next, an operation procedure of the system at a time when each battery pack 2 is newly registered will be described. FIG. 4 is a sequence diagram showing the operation procedure of the system at the time when the battery pack 2 is newly registered.

First, the management terminal 6 displays a new registration screen. Then, the administrator inputs the serial number of the battery pack 2, which has been read by a cradle as the administrator attaches the battery pack 2 thereto, into the new registration screen.

The management server 4 acquires the serial number inputted into the new registration screen, and registers the serial number on the shared battery list. Then, the management server 4 transmits the updated shared battery list to the battery exchanger 3.

The battery exchanger 3 can determine whether the returned battery packs 2 are genuine products (the battery packs 2 to be used in the battery exchange service) based on the shared battery list.

Figure 5:
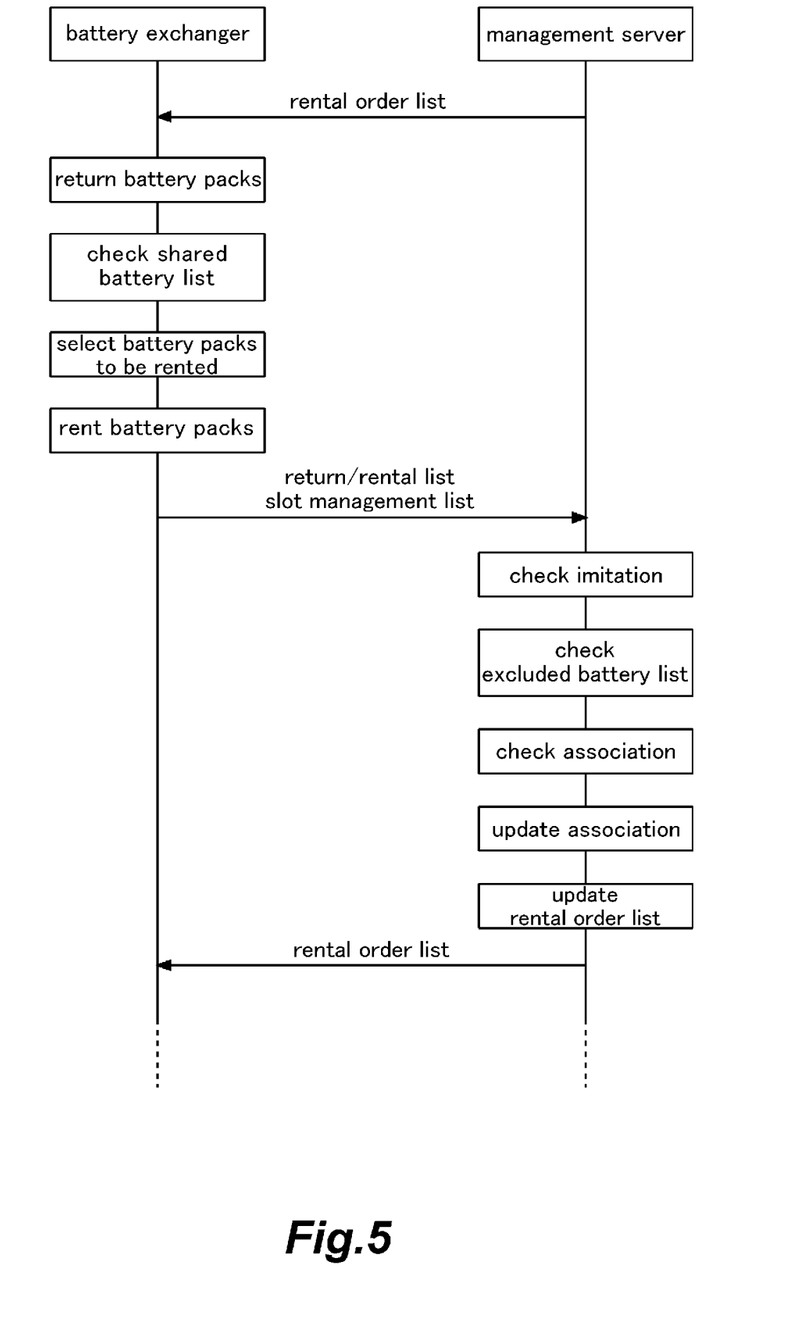
FIG. 5 is a sequence diagram showing an operation procedure of the system at the time when the battery packs 2 are exchanged.

Next, the operation procedure of the system at the time when the battery packs 2 are exchanged will be described. FIG. 5 is a sequence diagram showing the operation procedure of the system at the time when the battery packs 2 are exchanged.

First, the management server 4 transmits the rental order list, which defines the rental order of the battery packs 2, to the battery exchanger 3.

When the user returns the battery packs 2, the battery exchanger 3 checks whether the returned battery packs 2 are genuine products (the battery packs 2 to be used in the battery exchange service) based on the shared battery list. Incidentally, the shared battery list is transmitted from the management server 4 to the battery exchanger 3 in advance.

Next, the battery exchanger 3 selects the battery packs 2 to be rented based on the rental order list received from the management server 4, and rents the selected battery packs 2 to the user.

Next, the battery exchanger 3 transmits the return/rental list to the management server 4. This return/rental list includes information (serial numbers and the like) on the returned battery packs 2 and the rented battery packs 2 or the like.

By determining whether the serial number of each returned battery pack 2 is unregistered or registered, the management server 4 checks whether the returned battery pack 2 is suspected to be an imitation based on the return/rental list received from the battery exchanger 3. In a case where the battery pack 2 is suspected to be an imitation, the management server 4 outputs an alert.

Next, the management server 4 compares the serial number of each returned battery pack 2 with the excluded battery list, thereby checking whether the returned battery pack 2 is the battery pack 2 whose utilization is to be stopped. Incidentally, in a case where the serial number thereof matches the excluded battery list, the management server 4 prohibits subsequent registration of the battery pack 2 on the rental order list, and outputs an alert or the like to prompt recall.

Next, the management server 4 checks the associating information associating each battery pack 2 with the user ID of the user to whom the battery pack 2 is rented. More specifically, the management server 4 determines whether the associating information on the battery pack 2, which is returned in the online state, is present. Further, in a case where a plurality of battery packs 2 are returned, the management server 4 also determines whether the associating information on each battery pack 2 is associated with the same user ID.

Next, the management server 4 updates the associating information by the associating process. This associating process updates the associating information by assigning the user ID, which is associated with each battery pack 2 returned in the online state, to the rented battery pack 2.

Next, the management server 4 updates the rental order list. At this time, the management server 4 sets, based on a prescribed rule, the rental order of the battery packs 2 whose charging has been completed among the battery packs 2 stored in the battery exchanger 3. Then, the management server 4 transmits the rental order list to the battery exchanger 3.

Figure 6:
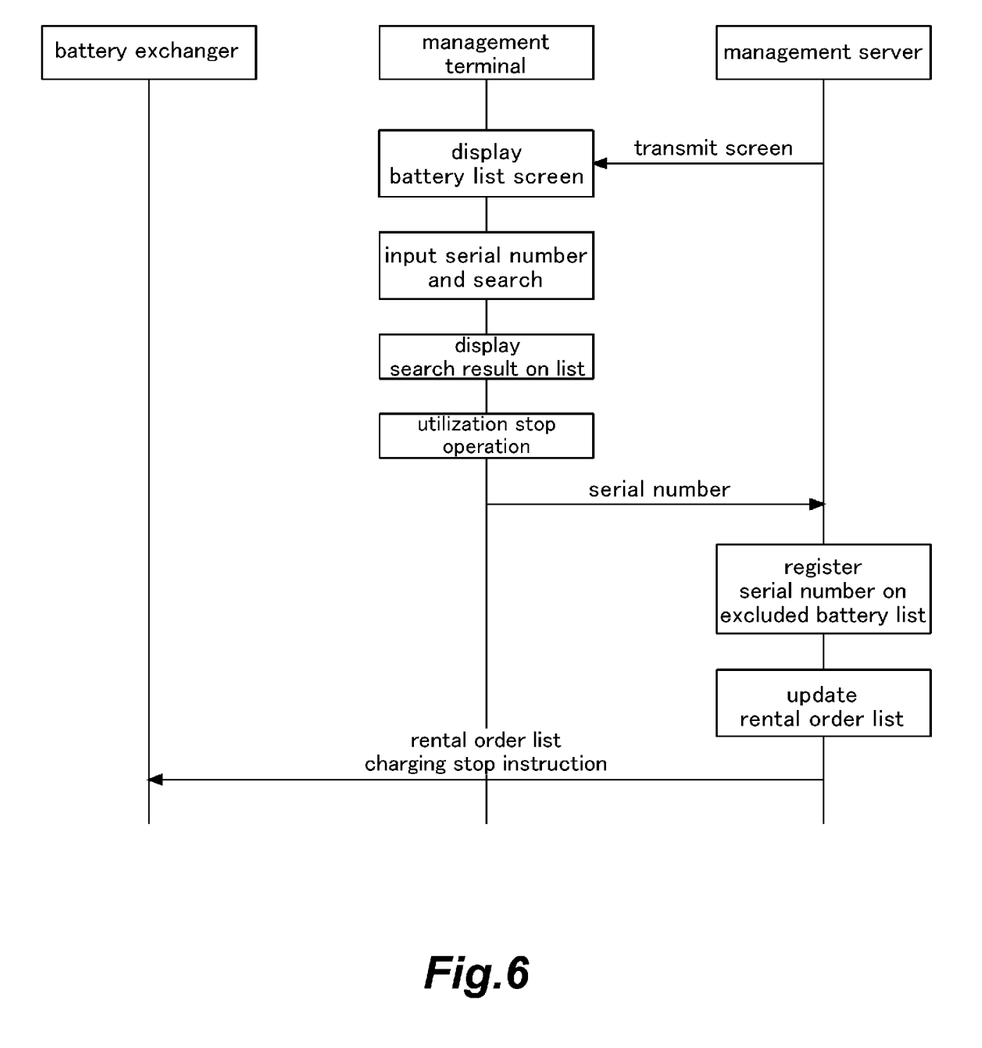
FIG. 6 is a sequence diagram showing an operation procedure of the system at a time when utilization of the battery pack 2 is stopped.

Next, an operation procedure of the system at a time when utilization of each battery pack 2 is stopped will be described. FIG. 6 is a sequence diagram showing the operation procedure of the system at the time when the utilization of the battery pack 2 is stopped.

In the present embodiment, each battery pack 2 that may have an abnormality in the future is identified based on the manufacturing lot, the serial number of the corresponding battery pack 2 is acquired, and the utilization of the battery pack 2 is stopped based on the serial number.

Incidentally, in the present embodiment, the utilization of the battery pack 2 is stopped for each manufacturing lot. Alternatively, the utilization of the battery pack 2 may be stopped when an abnormality of the battery pack 2 is detected. More specifically, if an alert indicating an occurrence of an abnormality is output from the battery pack 2 when the battery pack 2 is returned, the utilization of the battery pack 2 may be stopped. Further, if the battery exchanger 3 detects an abnormality such as an abnormal current when the battery pack 2 is charged, the utilization of the battery pack 2 may be stopped.

First, the management terminal 6 displays a battery list screen. On this battery list screen, the administrator inputs the serial number of the battery pack 2 to be a target as a search condition and performs an operation for carrying out a search. Accordingly, the management terminal 6 displays a search result on a list. The administrator checks the search result, and performs the utilization stop operation.

The management server 4 acquires the serial number inputted into the management terminal 6, and registers the serial number on the excluded battery list.

Next, the management server 4 refers to the excluded battery list, and updates the rental order list. At this time, in a case where the battery pack 2 to be the target is stored in the battery exchanger 3, the management server 4 excludes the battery pack 2 to be the target of a utilization stop from the rental order list of the battery exchanger 3. Further, the management server 4 generates charging stop instruction information to stop charging of the battery pack 2 whose utilization is to be stopped. Then, the management server 4 transmits the rental order list (rental prohibition notification) and the charging stop instruction information (charging stop notification) to the battery exchanger 3.

After that, the administrator requests the maintenance person to recall the battery pack 2 to be the target, and the maintenance person recalls the battery pack 2 to be the target from the battery exchanger 3.

In the present embodiment, the battery exchanger 3 selects the battery packs 2 to be rented based on the rental order list, and does not rent the battery packs 2 that are not on the rental order list even if they are stored in the own device. Consequently, it is possible to prohibit rental of the battery pack 2 whose utilization is to be stopped by excluding the battery pack 2 whose utilization is to be stopped from the rental order list.

Incidentally, in the present embodiment, the administrator performs the utilization stop operation of the battery pack 2 to be the target on the management terminal 6, but the maintenance person may perform the utilization stop operation on the maintenance terminal 7.

Figure 7A:
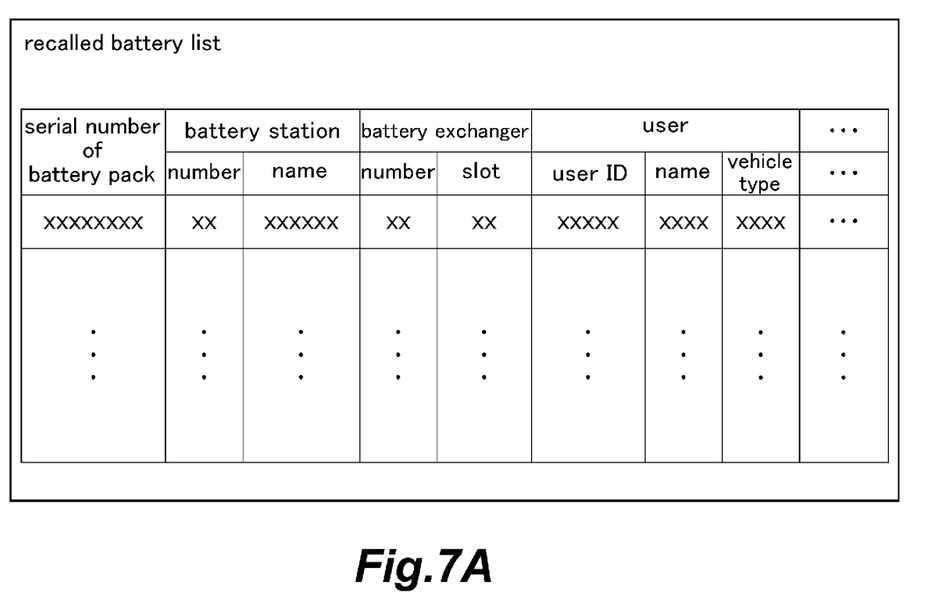
FIGS. 7A and 7B are explanatory diagrams each showing a recalled battery list screen displayed on a management terminal 6 and a maintenance terminal 7.
Figure 7B:
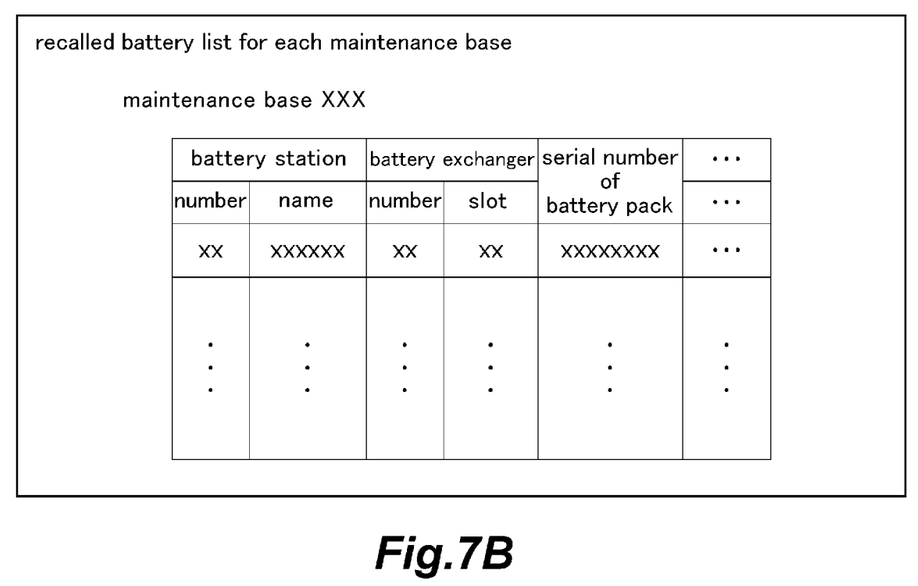

Next, a recalled battery list presented to the administrator and the maintenance person will be explained. FIGS. 7A and 7B are explanatory diagrams each showing a recalled battery list screen displayed on a management terminal 6 and a maintenance terminal 7.

The management server 4 generates the recalled battery list based on the excluded battery list, and causes the management terminal 6 and the maintenance terminal 7 to display a screen showing the recalled battery list, as shown in FIG. 7A.

On this recalled battery list, information on each battery pack 2 to be recalled is displayed on a list. In an example shown in FIG. 7A, the serial number of the battery pack 2 to be recalled and the information on the location of the battery pack 2 is recorded on the recalled battery list. More specifically, in a case where the battery pack 2 to be recalled is stored in the battery station, information (number, name, or the like) on the battery station, information (number or the like) on the battery exchanger 3 in which the battery pack 2 to be recalled is stored, and information (number or the like) on the slot (tray) in which the battery pack 2 to be recalled is installed, or the like are displayed. Further, in a case where the user is using the battery pack 2 to be recalled, user information (user ID, name, vehicle type, or the like) or the like are displayed.

By using this recalled battery list, the administrator and the maintenance person can grasp where the battery pack 2 to be recalled is.

Further, the management server 4 generates a recalled battery list for each maintenance base based on the excluded battery list, and causes the maintenance terminal 7 to display a screen showing the recalled battery list for each maintenance base, as shown in FIG. 7B.

On this recalled battery list for each maintenance base, information on each battery pack 2 to be recalled, which is present at the battery station covered by a designated maintenance base, is displayed on a list. In an example shown in FIG. 7B, information (number, name, or the like) on the battery station, information (number or the like) on the battery exchanger 3 in which the battery pack 2 to be recalled is stored, and information (number or the like) on the slot (tray) in which the battery pack 2 to be recalled is installed, and the serial number of the battery pack 2 to be recalled, or the like are displayed.

By this recalled battery list for each maintenance base, the maintenance person can easily check whether the battery pack 2 to be recalled is present at the battery station that he/she covers. Accordingly, the maintenance person can efficiently recall the battery pack 2 to be recalled.

Incidentally, in the present embodiment, the recalled battery list is displayed on a screen, but the recalled battery list may be printed out. Further, the recalled battery list relating to the battery station covered by the maintenance person may be transmitted to the maintenance terminal 7 by e-mail or the like.

Figure 8:
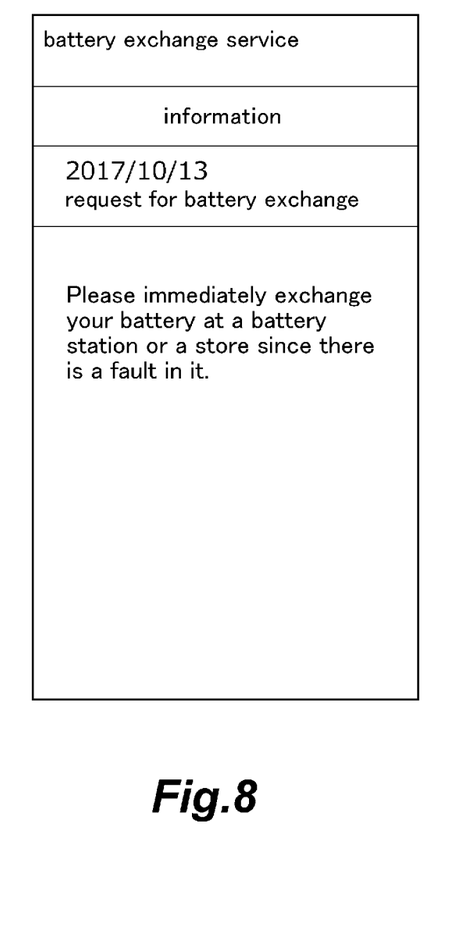
FIG. 8 is an explanatory diagram showing a notification screen displayed on a user terminal 5.

Next, a notification screen displayed on the user terminal 5 will be described. FIG. 8 is an explanatory diagram showing the notification screen.

In a case where the user is using the battery pack 2 to be recalled, the management server 4 generates the management information that associates the rented battery pack 2 with the user information (user ID, name, vehicle type, or the like) or the like of the user to whom the battery pack 2 is rented based on the excluded battery list. The management server 4 identifies the user using the battery pack 2 to be recalled, and transmits an exchange reminder to the user terminal 5 of the identified user. Upon receiving the exchange reminder, the user terminal 5 performs a notification operation that prompts the identified user to exchange the battery pack 2. More specifically, by using a mail transmission function and a push notification function that operates on an application relating to the battery exchange service, the management server 4 gives a notification to the user terminal 5 used by the user based on the user information set by the user at utilization registration of the battery exchange service. Accordingly, even if the user is using the battery pack 2 to be recalled, it is possible to efficiently identify the user and transmit the exchange reminder.

In the present embodiment, in a case where the user is using the battery pack 2 to be recalled, the management server 4 generates the notification screen as the exchange reminder and transmits the notification screen to the user terminal 5, and thus the notification screen is displayed on the user terminal 5. This notification screen displays a message that prompts the user to exchange the battery pack 2 the user is using.

When each battery pack 2 is returned to the battery exchanger 3, the battery exchanger 3 acquires the serial number of the returned battery pack 2, and transmits the return/rental list including the serial number to the management server 4. The management server 4 compares the serial number of the returned battery pack 2 with the excluded battery list, and outputs an alert in a case where the serial number and the excluded battery list match. The administrator or the maintenance person performs an operation of rental prohibition and charging prohibition in response to the alert, and the maintenance person recalls the battery pack 2 to be recalled from the battery exchanger 3.

Further, the above embodiment adopts a configuration that the management information that identifies the user using the battery pack 2 to be recalled is generated based on the excluded battery list at a time of the exchange reminder to the user. However, various configurations other than the above can be adopted. For example, the electric vehicle 1 may be provided with a function for reading the serial number of the battery pack 2, a function (Bluetooth, Wi-Fi, or the like) for wirelessly communicating with the user terminal 5 carried by the user, or the like. The management server 4 may acquire the read information on the serial number of the battery pack 2 from the electric vehicle 1 via the user terminal 5 at a timing when an information notification or the like is transmitted to the user, and compare the read information on the serial number of the battery pack 2 with the serial number of the battery pack 2 to be recalled registered in the management server 4. In a case where the read information and the serial number match, the management server 4 may transmit the exchange reminder to the user terminal 5 of the user. Then, upon receiving the exchange reminder, the user terminal 5 may perform the notification operation that prompts the user to exchange the battery pack 2. Like the above example, the notification operation is transmitted to the user terminal 5 used by the user by using a mail transmission function and a push notification function that operates on an application relating to the battery exchange service based on the user information set by the user when the user is registered to use the battery exchange service. Accordingly, even if there is inconsistency in the managed battery list on the management server 4, it is possible to efficiently perform the notification operation that prompts the user, who is using the battery pack 2 to be recalled, to exchange the battery pack 2.

The present invention has been described in terms of a specific embodiment, but is not limited by such an embodiment, and can be modified, substituted, added and omitted in other embodiments. Also, a new embodiment may be created by combining various components of the foregoing embodiment.

INDUSTRIAL APPLICABILITY

The battery management system and the battery management method according to the present disclosure have the effect of identifying a battery device that may have an abnormality in the future and promptly recalling such a battery device, are applicable to a battery exchange service which enables users of electric vehicles or the like to exchange battery devices at battery exchange devices, and are useful as a battery management system, a battery management method, or the like for managing shared battery devices.

REFERENCE NUMERALS

1: electric vehicle
2: battery pack (battery device)
3: battery exchanger (battery exchange device)
4: management server (server device)
5: user terminal (terminal device)
6: management terminal
7: maintenance terminal
31: sensor
32: driver
33: charger
34: communication device
35: input/output device
36: display
37: storage device
38: controller
41: communication device
42: storage device
43: controller

The invention claimed is:

1. A battery management system, comprising: a plurality of battery exchange devices located in respective battery stations and configured to store and charge battery devices returned by users and to rent the charged battery devices to the users in exchange for new returned battery devices; a server device connected to the battery exchange devices via a network and configured to manage eexchanging states of the battery devices at the battery exchange devices; and a terminal device carried by each user and connected to the server device via the network; wherein the server device is configured to identify a user using a battery device to be recalled by comparing individual identification information on the battery device in use by the user with the individual identification information on the battery device to be recalled, and to transmit an exchange reminder to the terminal device of the identified user, and the terminal device is configured to display a message that prompts the identified user to exchange the battery device upon receiving the exchange reminder;

wherein the server device is configured to acquire individual identification information on each battery device from a vehicle via the terminal device, to compare the acquired individual identification information with the individual identification information on the battery device to be recalled, and to transmit the exchange reminder to the terminal device of the identified user in a case where the acquired individual identification information matches the individual identification information on the battery device to be recalled;

wherein the server device acquires the individual identification information on each battery device from the vehicle via the terminal device at a timing when the server device transmits an information notification to the user.

2. The battery management system according to claim 1, wherein the server device is configured to output display information for displaying the battery device to be recalled on a list.

\* \* \* \* \*